(12) United States Patent
    Zhang et al.

(10) Patent No.: US 12,620,827 B2
(45) Date of Patent: May 5, 2026

(54) VOLTAGE REGULATION CIRCUIT, POWER SUPPLY MODULE, VEHICLE AND CONTROL METHOD

(71) Applicant: ZHUHAI COSMX POWER BATTERY CO., LTD., Zhuhai (CN)

(72) Inventors: Zhiguo Zhang, Zhuhai (CN); Jiadong Deng, Zhuhai (CN); Jiafan Wu, Zhuhai (CN); Lidong Wang, Zhuhai (CN)

(73) Assignee: ZHUHAI COSMIX POWER BATTERY CO., LTD., Zhuhai (CN)

( * ) Notice: Subject to any disclaimer, the term of this patent is extended or adjusted under 35 U.S.C. 154(b) by 194 days.

(21) Appl. No.: 18/399,502

(22) Filed: Dec. 28, 2023

(65) Prior Publication Data
    US 2024/0128784 A1       Apr. 18, 2024

Related U.S. Application Data

(63) Continuation of application No. PCT/CN2022/135186, filed on Nov. 29, 2022.

(30) Foreign Application Priority Data

Sep. 29, 2021    (CN) .......................... 202111150167.2

(51) Int. Cl.
    *H02M 3/156*        (2006.01)
    *H01M 10/48*        (2006.01)
                        (Continued)

(52) U.S. Cl.
    CPC ............. *H02J 7/96* (2026.01); *H01M 10/486* (2013.01); *H01M 10/615* (2015.04);
                        (Continued)

(58) Field of Classification Search
    CPC ..... G05F 1/00; G05F 1/10; G05F 1/12; G05F 1/46; G05F 1/455; G05F 1/45;
                        (Continued)

(56) References Cited

U.S. PATENT DOCUMENTS 10,680,519 B2 *  6/2020  Wang ................... H02M 3/1588
    11,005,368 B2 *  5/2021  Bansal .................... H03F 3/245
                        (Continued)

FOREIGN PATENT DOCUMENTS

CN        101527508 A      9/2009
    CN        101727158 A      6/2010
                        (Continued)

OTHER PUBLICATIONS

First Office Action issued in counterpart Chinese Patent Application No. 202111150167.2, dated Dec. 29, 2023.
                        (Continued)

*Primary Examiner* — Jeffrey A Gblende
(74) *Attorney, Agent, or Firm* — Westbridge IP LLC

(57) ABSTRACT

Disclosed are a voltage regulation circuit, a power supply module, a vehicle, and a control method. The voltage regulation circuit includes a first NMOS transistor, a second NMOS transistor, a third NMOS transistor, a control chip and an inductor; and an output terminal of the control chip is electrically connected to a gate electrode of the first NMOS transistor, a gate electrode of the second NMOS transistor, and a gate electrode of the third NMOS transistor, respectively; where a source electrode of the first NMOS transistor is electrically connected to a second terminal of the inductor. According to the technical solution of the present disclosure, at least a problem of a poor voltage regulation effect of an existing transformer may be solved.

18 Claims, 4 Drawing Sheets

(51) Int. Cl.

| | |
|---|---|
| *H01M 10/615* | (2014.01) |
| *H02J 7/96* | (2026.01) |
| *H02J 105/30* | (2026.01) |

(52) U.S. Cl.
CPC ........ *H02M 3/156* (2013.01); *H01M 2220/20* (2013.01); *H02J 2105/30* (2026.01)

(58) Field of Classification Search
CPC ... G05F 1/445; G05F 1/66; G05F 1/40; G05F 1/42; G05F 1/44; G05F 1/462; G05F 1/52; G05F 1/56; G05F 3/10; G05F 3/16; G05F 3/18; G05F 3/185; G05F 3/20; G05F 3/26; G05F 3/30; G05F 3/205; G05F 3/22; G05F 3/24; G05F 3/222; G05F 3/242; G05F 3/225; G05F 3/227; G05F 3/245; G05F 3/247; G05F 3/262; G05F 3/265; G05F 3/267; G05F 1/575; H02M 5/2573; H02M 1/081; H02M 5/293; H02M 7/12; H02M 3/10; H02M 3/125; H02M 3/13; H02M 3/135; H02M 3/145; H02M 3/15; H02M 3/155; H02M 3/156; H02M 3/157; H02M 3/158; H02M 1/346; H02M 3/1588; H02M 2003/1566; H02M 3/1582; H02M 3/1584; H02M 2003/1557; H02M 1/0032; H02M 1/4225; H02M 7/217; H02M 1/0025; H02M 1/0045; H02M 1/0009; H02M 1/08; H02M 1/088; H02M 1/0048; H05B 39/048; B23K 11/24; H04B 2215/069
See application file for complete search history.

(56) References Cited

U.S. PATENT DOCUMENTS

| | | | | |
|---|---|---|---|---|
| 12,184,164 | B2 * | 12/2024 | Lu | H02H 7/1213 |
| 2015/0188328 | A1 | 7/2015 | Abouda et al. | |
| 2018/0062415 | A1 * | 3/2018 | Chen | H02J 7/0047 |
| 2021/0249870 | A1 * | 8/2021 | Lan | H02J 7/0031 |

FOREIGN PATENT DOCUMENTS

| | | | |
|---|---|---|---|
| CN | 105051968 | A | 11/2015 |
| CN | 107947539 | A | 4/2018 |
| CN | 207490060 | U | 6/2018 |
| CN | 208819922 | U | 5/2019 |
| CN | 111347900 | A | 6/2020 |
| CN | 113852167 | A | 12/2021 |
| WO | 2020125771 | A1 | 6/2020 |

OTHER PUBLICATIONS

International Search Report issued in corresponding PCT Application No. PCT/CN2022/135186, dated Feb. 8, 2023.
Written Opinion issued in corresponding PCT Application No. PCT/CN2022/135186, dated Feb. 8, 2023.
Xiong et al., Core Algorithm of Power Battery Management System Version 2, 2021, pp. 266-271, China Machine Press, Beijing, dated Aug. 31, 2021.

* cited by examiner

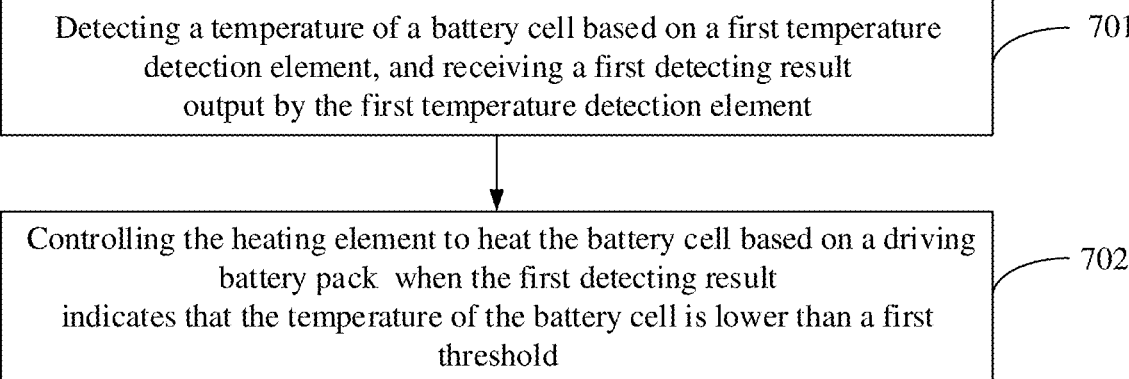

Detecting a temperature of a battery cell based on a first temperature detection element, and receiving a first detecting result output by the first temperature detection element — 701

Controlling the heating element to heat the battery cell based on a driving battery pack when the first detecting result indicates that the temperature of the battery cell is lower than a first threshold — 702

FIG. 7

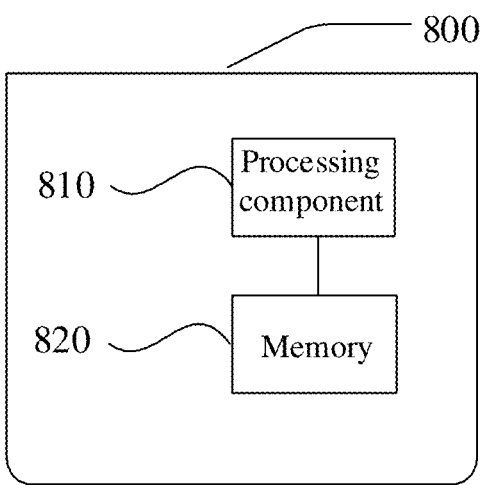

800

810 — Processing component

820 — Memory

FIG. 8

VOLTAGE REGULATION CIRCUIT, POWER SUPPLY MODULE, VEHICLE AND CONTROL METHOD

CROSS-REFERENCE TO RELATED APPLICATIONS

The present disclosure is a continuation of International Application No. PCT/CN2022/135186, filed on Nov. 29, 2022, which claims priority to Chinese Patent Application No. 202111150167.2, filed on Sep. 29, 2021. The disclosures of the aforementioned applications are hereby incorporated by reference in their entireties.

TECHNICAL FIELD

The present disclosure relates to the technical field of batteries, and in particular, to a voltage regulation circuit, a power supply module, a vehicle and a control method.

BACKGROUND

At present, in many circuit structures, due to a fact that working voltages of different electric devices are generally different, a power supply voltage is generally a fixed value, and a transformer generally needs to be arranged between the electric devices and a power supply when the working voltage and the power supply voltage of the electric devices are different values, so that an adjusted power supply voltage is matched with the working voltage of the electric devices. However, an existing transformer usually only has a one-way voltage regulation function, so that the existing transformer may not be suitable for a scenario where bidirectional voltage regulation needs to be performed, and it can be seen that the existing transformer has a poor voltage regulation effect.

SUMMARY

The present disclosure provides a voltage regulation circuit, a power supply module, a vehicle and a control method, which may solve a problem of poor voltage regulation effect of an existing transformer.

In order to solve the above technical problem, the present disclosure is implemented in this way.

In a first aspect, embodiments of the present disclosure provide a voltage regulation circuit, including: a first NMOS transistor, a second NMOS transistor, a third NMOS transistor, a control chip and an inductor, where a drain electrode of the first NMOS transistor is electrically connected to a drain electrode of the second NMOS transistor, a source electrode of the second NMOS transistor is electrically connected to a first terminal of the inductor, the first terminal of the inductor is further electrically connected to a drain electrode of the third NMOS transistor, and a source electrode of the third NMOS transistor is grounded; and an output terminal of the control chip is electrically connected to a gate electrode of the first NMOS transistor, a gate electrode of the second NMOS transistor, and a gate electrode of the third NMOS transistor, respectively; where a source electrode of the first NMOS transistor is electrically connected to a second terminal of the inductor, one of the source electrode of the first NMOS transistor and the second terminal of the inductor is configured to form an input terminal of the voltage regulation circuit, and the other of the source electrode of the first NMOS transistor and the second terminal of the inductor is configured to form an output terminal of the voltage regulation circuit.

In a second aspect, embodiments of the present disclosure provide a power supply module, including: a battery cell, a power line, and a bidirectional voltage converter, where the bidirectional voltage converter includes the voltage regulation circuit according to the first aspect; and a negative electrode of the battery cell is grounded, a positive electrode of the battery cell is electrically connected to a source electrode of the first NMOS transistor in the voltage regulation circuit, and a second terminal of the inductor in the voltage regulation circuit is electrically connected to the power line.

In to a third aspect, embodiments of the present disclosure provide a vehicle, including a driving battery pack and the power supply module according to the second aspect, where the driving battery pack is configured to drive the vehicle, and the driving battery pack is electrically connected to a control circuit board; where the control circuit board controls a heating element to heat a battery cell based on the driving battery pack when a first temperature detection element detects that a temperature of the battery cell is lower than a first threshold.

In a fourth aspect, embodiments of the present disclosure provide a control method, applied in a control circuit board in a vehicle according to the third aspect, including: detecting a temperature of a battery cell based on a first temperature detection element, and receiving a first detecting result output by the first temperature detection element; and controlling the heating element to heat the battery cell based on a driving battery pack when the first detecting result indicates that the temperature of the battery cell is lower than a first threshold.

In a fifth aspect, embodiments of the present disclosure provide an electronic device, including: a processor component; and a memory, wherein the memory stores computer program instructions, and when the computer program instructions are run by the processor, the processor is configured to implement the control method according to the fourth aspect.

According to the embodiments of the present disclosure, in case of the second terminal of the inductor is connected to a power supply, and the source of the first NMOS transistor is connected to a power supply device, when the power supply voltage needs to be increased to charge the power supply device, the first NMOS transistor and the second NMOS transistor may be respectively controlled to be disconnected through the control chip, and the third NMOS transistor is controlled to be turned on, at this time, a high resistance is formed between the input terminal and the output terminal of the voltage regulation circuit, and the inductor may be conducted with the ground wire through the third NMOS transistor, thereby forming a loop, and further charging the inductor through the power supply. When a charging energy storage of the inductive reaches a specified value, the first NMOS transistor and the second NMOS transistor are controlled to be conducted through the control chip, and the third NMOS transistor is controlled to be disconnected, and in this case, an electric charging voltage of the power supply device is equal to a sum of a voltage of the power supply and a voltage of the inductor. Correspondingly, when the power supply device needs to discharge outwards, and a discharge voltage of the power supply device needs to be reduced, the first NMOS transistor and the second NMOS transistor may be respectively controlled to be turned on, and the third NMOS transistor is controlled to be disconnected, in this case, the power supply device charges the inductor, and at the same time, power is supplied outwards through the second terminal of the inductor. Due to a voltage division of the inductor, the power supply voltage of the battery cell may be reduced, thereby realizing bidirectional voltage regulation.

BRIEF DESCRIPTION OF THE DRAWINGS

To describe the technical solutions in the embodiments of the present disclosure more clearly, the following briefly introduces accompanying drawings required for describing the embodiments or the prior art. Apparently, the accompanying drawings in the following description show merely some embodiments of the present disclosure, and a person of ordinary skill in the art may still derive other drawings according to these accompanying drawings without creative efforts.

FIG. 7 is a schematic flowchart of a control method according to an embodiment of the present disclosure.

FIG. 8 is a schematic structural diagram of an electronic device for controlling according to an embodiment of the present disclosure.

DETAILED DESCRIPTION OF THE EMBODIMENTS

Technical solutions in the embodiments of the present disclosure are clearly and completely described below with reference to the accompanying drawings in the embodiments of the present disclosure. Apparently, the described embodiments are a part of the embodiments of the present disclosure, rather than all the embodiments. Based on the embodiments of the present disclosure, all other embodiments obtained by those of ordinary skill in the art without creative work fall within the protection scope of the present disclosure.

The terms "first", "second" and the like in the specification and claims of the present disclosure are used to distinguish similar objects, and are not used to describe a specific order or sequence. It should be understood that the data used in this way can be interchanged under appropriate circumstances, so that the embodiments of the present disclosure can be implemented in an order other than those illustrated or described herein, and objects distinguished by "first", "second" and the like are generally one type, and do not define the number of objects, such as one or more of the first objects. In addition, in the specification and in the claims, "and/or" means at least one of the connected objects, and the character "/" generally indicates that the associated object is a "or" relationship.

Figures 1, 2:
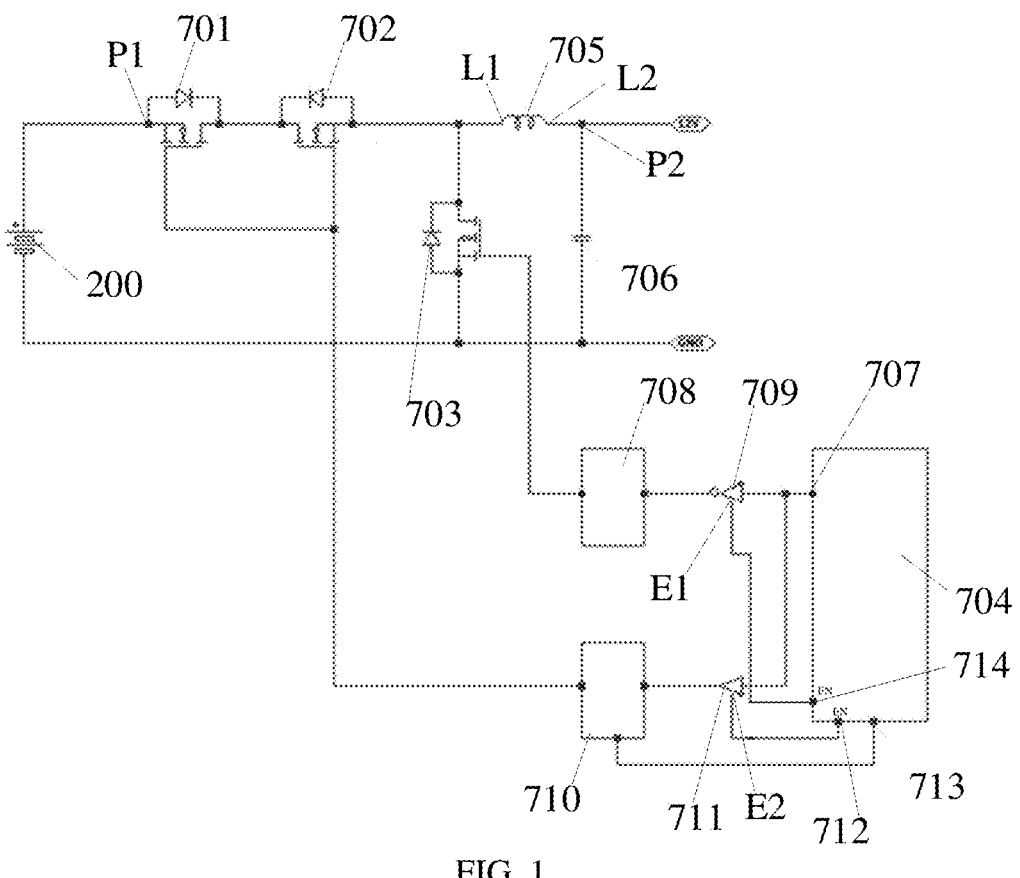
FIG. 1 is a schematic structural diagram of a voltage regulation circuit according to an embodiment of the present disclosure.
FIG. 2 is a schematic diagram of electrical connection between a bidirectional voltage converter, a battery cell, a heating element and a power line according to an embodiment of the present disclosure.

Referring to FIG. 1, which is a voltage regulation circuit according to an embodiment of the present disclosure, the voltage regulation circuit includes a first NMOS transistor 701, a second NMOS transistor 702, a third NMOS transistor 703, a control chip 704 and an inductor 705, a drain electrode of the first NMOS transistor 701 is electrically connected to a drain electrode of the second NMOS transistor 702, a source electrode of the second NMOS transistor 702 is electrically connected to a first terminal L1 of the inductor 705, the first terminal L1 of the inductor 705 is further electrically connected to a drain electrode of the third NMOS transistor 703, and a source electrode of the third NMOS transistor 703 is grounded.

An output terminal 707 of the control chip 704 is electrically connected to a gate electrode of the first NMOS transistor 701, a gate electrode of the second NMOS transistor 702, and a gate electrode of the third NMOS transistor 703, respectively.

A source electrode of the first NMOS transistor 701 is configured as a first port P1 of the voltage regulation circuit, and a second terminal L2 of the inductor 705 is configured as a second port P2 of the voltage regulation circuit, wherein, in operation, one of the first port P1 and the second port P2 serves as an input terminal of the voltage regulation circuit, while the other serves as an output terminal of the voltage regulation circuit, thereby enabling bidirectional power flow through the voltage regulation circuit.

The voltage regulation circuit provided in the embodiments of the present disclosure may be adapted to various scenarios where voltage needs to be performed. Specifically, the voltage regulation circuit may be suitable for a one-way voltage regulation scenario, or may be a scenario where bidirectional voltage regulation needs to be performed.

For example, various existing power supply devices generally have needs for charging and discharging, when an external power supply voltage is less than a charging and discharging voltage of the power supply device, the voltage regulation circuit may be arranged in the power supply device, so that when the power supply voltage needs to be increased to charge the power supply device, the first NMOS transistor 701 and the second NMOS transistor 702 may be respectively controlled to be disconnected through the control chip 704, and the third NMOS transistor 703 is controlled to be turned on, at this time, a high resistance is formed between the input terminal and the output terminal of the voltage regulation circuit, and the inductor 705 may be turned on with the ground wire through the third NMOS transistor 703, thereby forming a loop, and further charging the inductor 705 through the power supply. When a charging energy storage of the inductor 705 reaches a specified value, the first NMOS transistor 701 and the second NMOS transistor 702 are respectively controlled to be turned on through the control chip 704, and the third NMOS transistor 703 is controlled to be disconnected, and in this case, the charging voltage of the power supply device is equal to a sum of the voltage of the power supply and a voltage of the inductor 705. Correspondingly, when the power supply device needs to discharge outwards, and the discharge voltage of the power supply device needs to be reduced, the first NMOS transistor 701 and the second NMOS transistor 702 may be respectively controlled to be turned on, and the third NMOS transistor 703 is controlled to be disconnected, and in this case, the power supply device charges the inductor 705, and at the same time, power is supplied outwards through the second terminal of the inductor 705. Due to a voltage division of the inductor 705, the power supply voltage of the battery cell may be reduced, thereby realizing bidirectional voltage regulation.

Optionally, the voltage regulation circuit 700 further includes a capacitor 706, and the second terminal L2 of the inductor 705 is grounded through the capacitor 706.

Specifically, since a length of a power line 800 of the external power supply is generally long, the power line 800 may be equivalent to a resistor during charging and discharging of the power supply device, in order to avoid the influence of the power line 800 on the inductor 705, in the embodiment of the present disclosure, the second terminal L2 of the inductor 705 is grounded through the capacitor 706, so that the inductor 705 and the power line 800 may be isolated through the capacitor 706, thereby further improving the charging and discharging effect of the battery cell 200.

Optionally, the voltage regulation circuit further includes an enabling controller 709 and a first driver 708, an output terminal 707 of the control chip 704 is electrically connected to a gate electrode of the third NMOS transistor 703 through the enabling controller 709 and the first driver 708 in sequence, an enable terminal E1 of the enabling controller 709 is electrically connected to a first enable terminal 714 of the control chip 704, and the enabling controller may be an phase inverter with an output enable function.

The voltage regulation circuit further includes an inverter 711 having an enable terminal E2 and a second driver 710, where the output terminal 707 of the control chip 704 is electrically connected to the gate-electrode electrodes of the first NMOS transistor 701 and the second NMOS transistor 702 through the inverter 711 and the second driver 710 in sequence, and the enable terminal E2 of the inverter 711 is electrically connected to a second enable terminal 712 of the control chip 704.

The first driver 708 and the second driver 710 may adopt a common driver for a driving circuit in the prior art, the enabling controller 709 may adopt a common enabling controller in the prior art, the inverter with enable 711 may adopt a common inverter with enable in the prior art, and the control chip 704 may adopt a common control chip in the prior art.

In the embodiment, by providing various drivers and controllers between the control chip 704 and each NMOS transistor, a control effect of the control chip 704 on the each NMOS transistor may be improved.

Referring to FIG. 2, which is a power supply module according to an embodiment of the present disclosure, the power supply module includes a battery cell 200, a power line 800, and a bidirectional voltage converter 700, where the bidirectional voltage converter 700 includes the voltage regulation circuit according to the above embodiments.

A negative electrode of the battery cell 200 is grounded, a positive electrode of the battery cell 200 is electrically connected to a source electrode of the first NMOS transistor 701 in the voltage regulation circuit, and the second terminal L2 of the inductor 705 in the voltage regulation circuit is electrically connected to the power line.

Specifically, when the power supply module is applied to a starting battery of a vehicle with a voltage of 12V, an upper voltage limit of a power bus with the voltage of 12V on the vehicle is generally about 15V, and if the battery cell 200 is a battery pack with the voltage of 12V formed by connecting four-string ternary lithium battery cells 200 in series, after the four-string ternary lithium battery cells 200 is connected in series an upper limit of a charging voltage is 4.2×4=16.8V, so that a charging voltage of 15V on the power bus will cause the battery to be unable to be fully charged. Specifically, in this case, charging the battery cell 200 with a voltage of 15V may only charge to approximately 70%. That is, a utilization rate of the battery cell 200 may be lost by 30%, resulting in wasted costs.

Based on this, in the embodiment of the present disclosure, by providing the bidirectional voltage converter 700 between the positive electrode of the battery cell 200 and the power line 800, in this way, when an external charging voltage of the battery cell 200 is lower than an internal upper voltage limit of the battery cell 200 during a charging process of the battery cell 200, the bidirectional voltage converter 700 is started, and the bidirectional voltage converter 700 is in a boost mode, so that the bidirectional voltage converter 700 boosts the charging voltage of about 15V to 16.8 V to charge the internal battery cell 200, thereby achieving an effect of full battery charging. During a discharging process of the battery cell 200, the bidirectional voltage converter 700 is started, and the bidirectional voltage converter 700 is in a buck mode, so that the voltage of the battery cell 200 is depressurized by the bidirectional voltage converter 700 and then the voltage is output, so that the battery cell 200 may meet the bus voltage level of the vehicle with the voltage of 12V.

Optionally, the second terminal L2 of the inductor 705 is electrically connected to the power line 800 through a first switch 910.

Specifically, when the battery cell 200 is in a normal state, for example, in a standby or working state, the first switch 910 is closed. When the battery cell 200 is in an abnormal state, for example, the battery cell 200 cannot be used, the first switch 910 is disconnected, so that the safety of the external power bus may be further improved.

Optionally, the power supply module further includes a housing 100, a heating element 400, a control circuit board 300, and a first temperature detection element.

The battery cell 200, the heating element 400 and the first temperature detection element are disposed in the housing 100, respectively. The battery cell 200, the heating element 400 and the first temperature detection element is electrically connected to the control circuit board 300, respectively.

The control circuit board 300 controls the heating element 400 to heat the battery cell 200 when the first temperature detection element detects that a temperature of the battery cell 200 is lower than a first threshold.

Figure 3:
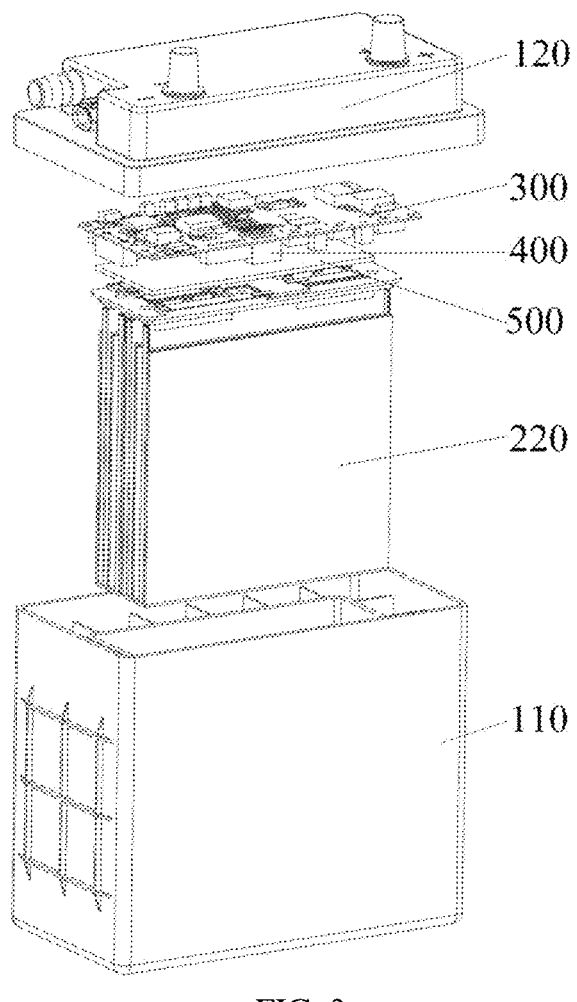
FIG. 3 is one of a schematic structural diagram of a power supply module according to an embodiment of the present disclosure.
Figure 4:
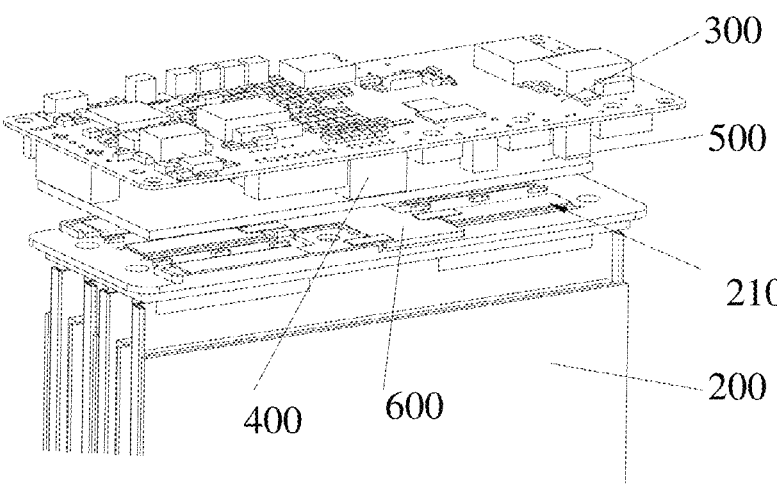
FIG. 4 is a schematic diagram of an internal structure of a power supply module according to an embodiment of the present disclosure.

Specifically, referring to FIG. 3, the housing 100 may include a housing body 110 and a cover body 120, the housing body 110 has an accommodating cavity 1111, the cover body 120 may cover an opening of the accommodating cavity 1111, and a power supply terminal may be provided on the cover body 120, which is used for electrical connection with an external device, so that the battery cell 200 may supply power to the external device.

According to the present disclosure, the power supply module may be used for supplying power to various outdoor devices, for example, the power supply module may be used as a power supply unit in a vehicle, as well as power supply units in various agricultural mechanical devices, and the like.

The heating element 400 may be a heating resistance wire, a heating rod, or the like. The control circuit board 300 may be a battery management system (BMS). The first temperature detection element may be any existing component having a temperature detection function, for example, a temperature sensor. The first threshold may be selected according to an actual situation, for example, in the embodiment of the present disclosure, the first threshold is −20 degrees.

In a specific implementation, the temperature of the battery cell 200 may be detected in real time by means of the first temperature detection element, and a first detecting result may be sent to the control circuit board 300 when the first temperature detection element monitors that the temperature of the battery cell 200 is lower than the first threshold. The first detecting result is used to indicate that the temperature of the battery cell 200 is lower than the first threshold. The control circuit board 300 may control the heating element 400 to work after receiving the first detection result, so as to heat the battery cell 200 through the heating element 400, thereby increasing the temperature of the battery cell 200.

In the embodiment, the temperature of the battery cell 200 is detected based on the first temperature detection element, and the heating element 400 is controlled to heat the battery cell 200 when a result output by the first temperature detection element indicates that the temperature of the battery cell 200 is low, thus avoiding a problem that the temperature of the battery cell 200 is too low, resulting in a decrease discharge capacity, thereby improving a power supply effect of the battery cell 200.

Optionally, the power supply module further includes a thermally conductive plate 500, the heating element 400 is connected to the thermally conductive plate 500, and the thermally conductive plate 500 covers a surface of the battery cell 200.

The thermally conductive plate 500 may be a plate made of a variety of materials having a heat conduction function, for example, the thermally conductive plate 500 may be a thermally conductive silicone pad.

In the embodiment, the surface of the battery cell 200 is covered with the thermally conductive plate 500, and the thermally conductive plate 500 is heated by the heating element 400, so that a heat of the heating element 400 may be transferred to the battery cell 200 through the thermally conductive plate 500, so as to improve the temperature of the battery cell 200. Meanwhile, since the thermally conductive plate 500 covers the battery cell 200, a contact area between the battery cell 200 and a heat source may be increased, thereby further improving a heating effect on the battery cell 200.

Optionally, the power supply module further includes an adapter circuit board 600, one terminal of the adapter circuit board 600 is electrically connected to a tab 210 of the battery cell 200, and the other terminal of the adapter circuit board 600 is electrically connected to the control circuit board 300.

The adapter circuit board 600 is located between the thermally conductive plate 500 and the battery cell 200, and the first temperature detection element is disposed on the adapter circuit board 600.

The adapter circuit board 600 may be a voltage acquisition board, and the one terminal of the adapter circuit board 600 is electrically connected to the tab 210 of the battery cell 200, and the other terminal is electrically connected to the control circuit board 300, so that an electrical connection between the battery cell 200 and the control circuit board 300 is realized.

It may be understood that since the adapter circuit board 600 is located between the thermally conductive plate 500 and the battery cell 200, and the one terminal of the adapter circuit board 600 is electrically connected to the tab 210 of the battery cell 200, the tab 210 of the battery cell 200 may be in contact with the thermally conductive plate 500. In this way, after a heat of the heating element 400 is transferred to the thermally conduction plate 500, the thermally conduction plate 500 may transfer the heat to the tab 210 of the battery cell 200, thereby increasing the temperature of the battery cell 200.

In the embodiment, since the adapter circuit board 600 is located between the thermally conductive plate 500 and the battery cell 200, and the adapter circuit board 600 is in direct contact with the battery cell 200, an accuracy of temperature detection of the battery cell 200 by the first temperature detection element may be improved by disposing the first temperature detection element on the adapter circuit board 600.

Optionally, the housing 100 includes an inner housing 111 and an outer housing 112, the inner housing 111 is located inside the outer housing 112, an interlayer is formed between the inner housing 111 and the outer housing 112, and an accommodating cavity 1111 is formed inside the inner housing 111.

The battery cell 200, the heating element 400 and the first temperature detection element are located inside the accommodating cavity 1111, respectively.

The interlayer may be a vacuum interlayer to improve a thermal insulation effect of the housing 100. In addition, the interlayer may be filled with a thermal insulation material, or the interlayer may be filled with a phase change heat storage material, so as to improve the thermal insulation effect of the housing 100.

Figure 5:
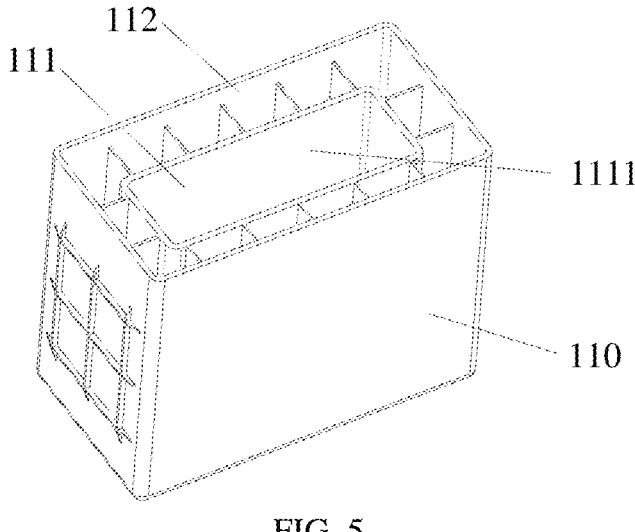
FIG. 5 is a schematic structural diagram of a housing body according to an embodiment of the present disclosure.
Figure 6:
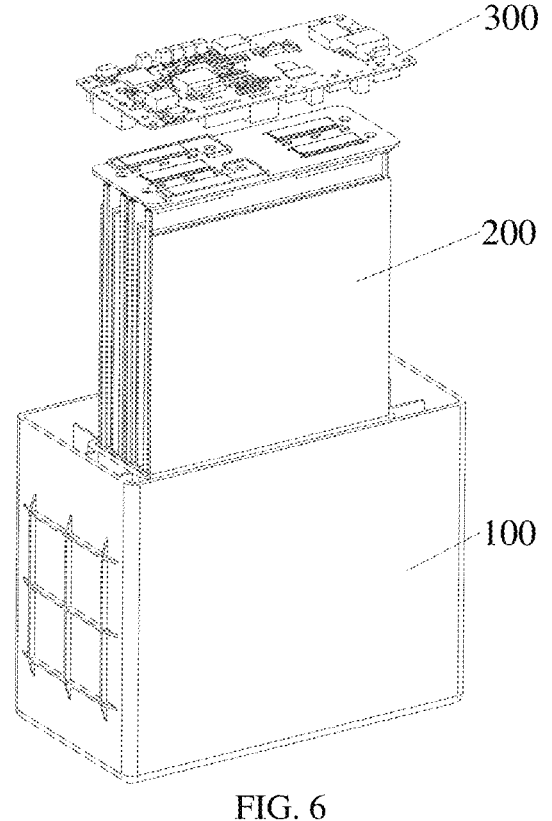
FIG. 6 is a second schematic structural diagram of a power supply module according to an embodiment of the present disclosure.

Referring to FIG. 5, in an embodiment of the present disclosure, the housing body 110 may include an inner housing 111 and an outer housing 112 to form an interlayer structure in the housing body 110 when the housing 100 includes a housing body 110 and a cover body 120. One terminal of the housing body 110 is provided with an opening, and the cover body 120 covers the opening of the housing body 110.

In addition, in order to further improve the thermal insulation effect of the housing 100, in an embodiment of the present disclosure, the housing 100 may be designed with a material having good thermal insulation performance instead of a conventional housing material having better thermal conductivity, such as a gum material with good thermal insulation performance instead of a metal material housing 100 with a good thermal conductivity. It should be noted that, since a power supply module according to the present disclosure is mainly applied to a low-temperature scenario, a thermal insulation effect of the power supply module is mainly considered during the power supply module is designed, and a requirement for a heat dissipation performance of the power supply module is not high.

In the embodiment, the thermal insulation effect of the housing 100 is improved by forming the interlayer in the housing 100, which is beneficial to prolong a thermal insulation duration of the housing 100 to the internal battery cell 200, and delay the temperature decrease rate of the battery cell 200 in a low-temperature environment.

Optionally, a surface of the battery cell 200 is covered with a thermal insulation layer 220.

Referring to FIG. 3, in an embodiment of the present disclosure, two opposite sides of the battery cell 200 are covered with the thermal insulation layer 220, where the thermal insulation layer 220 may be thermal insulation cotton, so that a thermal insulation effect of the battery cell 200 may be further improved.

Optionally, an input terminal of the heating element 400 is electrically connected to the power line 800 through a second switch 920, and an output terminal of the heating element 400 is grounded through a third switch 930.

Specifically, when the heating element 400 needs to be controlled to heat the battery cell 200, the control circuit board 300 may respectively control the second switch 920 and the third switch 930 to be closed, so as to supply power to the heating element 400 through the power line 800. When the heating element 400 needs to be controlled to stop heating the battery cell 200, the control circuit board 300 may respectively control the second switch 920 and the third switch 930 to be disconnected, so as to stop supplying power to the heating element 400. In the embodiment of the present disclosure, by controlling a synchronized operation of the second switch 920 and the third switch 930 so that power supply to the heating element 400 may be stopped even when one of the second switch 920 and the third switch 930 is short-circuited, thereby improving a security of the heating element 400.

Another embodiment of the present disclosure provides a vehicle, the vehicle includes a driving battery pack and the power supply module according to the above embodiments, the driving battery pack is configured to drive the vehicle, and the driving battery pack is electrically connected to a control circuit board 300;

The control circuit board 300 controls a heating element 400 to heat a battery cell 200 based on the driving battery pack when a first temperature detection element detects that a temperature of the battery cell 200 is lower than a first threshold.

Since the vehicle according to the embodiment includes the power supply module in the above embodiments, all of the beneficial effects of the power supply module in the above embodiments may be achieved, and a specific structure of the power supply module will not be repeated in order to avoid repetition.

Specifically, the vehicle may be a pure electric vehicle or a hybrid electric vehicle, and the driving battery pack may be used as a high-voltage power battery pack of the vehicle to provide the driving battery pack to drive the vehicle. The power supply module may be used as a starting power supply of the driving battery pack, for example, a conventional starting battery with the voltage of 12V may be replaced by the power supply module. In this way, compared with a conventional starting battery, the power supply module in the present disclosure has better starting effect in a low-temperature environment, which may improve a success rate of starting the vehicle in a low-temperature environment. In addition, the power supply module may also serve as a low-voltage power supply in the vehicle to power vehicle-mounted device.

It may be understood that a power supply voltage of the driving battery pack is greater than that of the power supply module, an output voltage value of the driving battery pack may be selected according to a power supply type of a generator of the vehicle. Correspondingly, the output voltage value of the power supply module may also be selected according to the power supply type of the vehicle-mounted device, for example, a value of the power supply voltage of the driving battery pack is 114V, 288V, 317V, 346V, 400V, 576V and the like, and the power supply voltage of the power supply module may be 12V/48V.

Referring to FIG. 7, which is a control method according to another embodiment of the present disclosure, applied to a control circuit board 300 in the vehicle in the above embodiment, for example, the method may be executed by a control chip, and the method includes:

Step 701, detecting a temperature of a battery cell 200 based on a first temperature detection element, and receiving a first detecting result output by the first temperature detection element.

Step 702, controlling the heating element 400 to heat the battery cell 200 based on a driving battery pack when the first detecting result indicates that the temperature of the battery cell 200 is lower than a first threshold.

The control method according to the embodiment is a method corresponding to the vehicle in the above embodiment, and a specific implementation process may refer to above embodiment, which is not repeated herein for avoiding repetition.

In the embodiment, the temperature of the battery cell 200 is detected based on the first temperature detection element, and the heating element 400 is controlled to heat the battery cell 200 when a result output by the first temperature detection element indicates that the temperature of the battery cell 200 is low, thus avoiding a problem that the temperature of the battery cell 200 is too low, resulting in a decrease discharge capacity, thereby improving a power supply effect of the battery cell 200.

Optionally, after the controlling the heating element 400 to heat the battery cell 200 based on a driving battery pack, the method further includes:

Detecting the temperature of the battery cell 200 based on the first temperature detection element, and receiving a second detecting result output by the first temperature detection element.

Controlling the driving battery pack to stop supplying power to the heating element 400 when the second detecting result indicates that the temperature of the battery cell 200 is higher than a second threshold.

Where the second threshold may be selected according to an actual situation, for example, the second threshold may be 0° or 25°.

Specifically, during a process of heating the battery cell 200 by the heating element 400, a real-time temperature of the battery cell 200 may be continuously monitored by the first temperature detection element, and the second detecting result may be sent to the control circuit board 300 when the first temperature detection element monitors that a temperature value of the battery cell 200 exceeds the second threshold, where the second detecting result is used for indicating that the temperature value of the battery cell 200 exceeds the second threshold. The control circuit board 300 stops supplying power to the heating element 400 when the second detecting result is received, thereby ending the heating process of the battery cell 200.

In the embodiment, during the process of heating the battery cell 200, the temperature of the battery cell 200 is monitored in real time by the first temperature detection element, and the process of heating the battery cell 200 is stopped when the temperature of the battery cell 200 exceeds the second threshold, thereby avoiding the problem that the battery cell 200 is damaged due to high temperature as a result of continuous heating of the battery cell 200. In addition, it also ensured that the temperature of the battery cell 200 is within a controlled temperature range.

Optionally, the vehicle further includes a second temperature detection element for detecting an external environment temperature of the vehicle, and before the controlling the driving battery pack to stop supplying power to the heating element 400, the method further includes:

Obtaining a detecting result of the second temperature detection element, and obtaining an average parking duration of each parking of the vehicle within a preset time period.

Calculating the second threshold based on the detecting result of the second temperature detection element and the average parking duration.

Specifically, since the housing 100 itself has a thermal insulation function, after the heating element 400 heats the temperature of the battery cell 200 to exceed the second threshold, even if the heating of the battery cell 200 is stopped, the temperature of the battery cell 200 may still be maintained for a certain period of time (hereinafter referred to as an thermal insulation duration) to ensure that the vehicle can be normally started. However, since the longer a parking duration of the vehicle or the lower an external temperature, the shorter the thermal insulation duration. At the same time, if the value of the second threshold is greater, the longer the thermal insulation duration is. Therefore, a correspondence between a predicted parking duration, the external temperature and the second threshold may be predetermined. Specifically, if the predicted parking duration is longer, the larger the value of the second threshold may be, or the lower the external temperature, the larger the value of the second threshold may be. In this way, it can be ensured that the vehicle can always be normally started during the predicted parking duration.

Specifically, after the vehicle is parked, a current environment temperature may be detected by the second temperature detection element, where the second temperature detection element may be a temperature sensor. At the same time, the control circuit board 300 each time may be used to record the time point at which the vehicle is parked and the time point at which the vehicle is started, where the time point at which the vehicle is parked may be a time point at which the driving battery pack is powered off, and the time point at which the vehicle is started may be a time point at which the driving battery pack to supply power, so that the parking duration may be calculated, where the preset time period may be a past one month or half a year, and so that by counting the average parking duration during the preset time period and taking it as the predicted parking duration for this parking, then the second threshold may be calculated based on the correspondence between the predicted parking duration, the external temperature and the second threshold.

Optionally, after receiving the first detecting result of detecting the temperature of the battery cell 200 by the first temperature detection element, the method further includes:

Controlling the driving battery pack to charge the battery cell 200 when the first detecting result indicates that the temperature of the battery cell 200 is lower than the first threshold.

Specifically, since the battery cell 200 generates a certain amount of heat during the charging process, the battery cell 200 may be charged by the driving battery pack when the first detecting result indicates that the temperature of the battery cell 200 is lower than the first threshold, so that the temperature of the battery cell 200 may be improved, and the battery cell 200 may also be charged, so as to further ensure that the vehicle can be normally started in a low-temperature environment.

Referring to FIG. 8, which is a schematic structural diagram of an electronic device for control according to an embodiment of the present disclosure.

An electronic device 800 includes a processing component 810, which further includes one or more processors, and memory resources represented by a memory 820 for storing instructions executable by the processing component 810, such as an application. The application stored in the memory 820 may include one or more modules each corresponding to a set of instructions. In addition, the processing component 810 is configured to execute instructions to perform the above method for a control method.

The electronic device 800 may also include a power supply component configured to perform power management of the electronic device 800, a wired or wireless network interface configured to connect the electronic device 800 to a network, and an input-output (I/O) interface. The electronic device 800 may be operated based on an operating system stored in the memory 820, such as Windows Server™, Mac OS X™, Unix™, Linux™, FreeBSD™, or the like.

A non-transitory computer-readable storage medium, the electronic device 800 is enabled to perform a control method when instructions in the non-transitory computer-readable storage medium are executed by the processor of the electronic device 800, which includes:

Detecting a temperature of a battery cell 200 based on a first temperature detection element, and receiving a first detecting result output by the first temperature detection element; and Controlling the heating element 400 to heat the battery cell 200 based on a driving battery pack when the first detecting result indicates that the temperature of the battery cell 200 is lower than a first threshold.

All optional technical solutions above may be randomly combined to form an optional embodiment of the present disclosure, and details are not described herein again.

A person of ordinary skill in the art may be aware that, in combination with the examples described in the embodiments disclosed in this specification, units, and algorithm steps may be implemented by electronic hardware, computer software, or a combination thereof. Whether the functions are performed by hardware or software depends on particular applications and design constraint conditions of the technical solutions. A person skilled in the art may use different methods to implement the described functions for each particular application, but it should not be considered that the implementation goes beyond the scope of the present disclosure.

It may be clearly understood by a person skilled in the art that, for the purpose of convenient and brief description, for a detailed working process of the foregoing modules and unit, may be referred to a corresponding process in the foregoing method embodiments, and details are not described herein again.

In several embodiments provided in the present disclosure, it should be understood that the disclosed modules and method may be implemented in other manners. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatus or units may be implemented in electronic, mechanical, or other forms.

The units described as separate parts may or may not be physically separated, and parts displayed as units may or may not be physical units, that is, may be located in one position, or may be distributed on a plurality of network units. A part or all of the units may be selected according to actual needs to achieve the objectives of the solutions of the embodiments of the present disclosure.

In addition, each function unit in the embodiments of the present disclosure may be integrated into one processing unit, or each of the units may exist alone physically, or two or more units are integrated into one unit.

When the functions are implemented in a form of a software function unit and sold or used as an independent product, the functions may be stored in a computer-readable storage medium. Based on such an understanding, the technical solutions of the present disclosure essentially, or the part contributing to the prior art, or a part of the technical solutions may be implemented in a form of a software product. The computer software product is stored in a storage medium and includes several instructions for instructing a computer device (which may be a personal computer, a server, a network device, or the like) to perform all or a part of the steps of the methods described in the embodiments of the present disclosure. The foregoing storage medium includes: any medium that may store program check codes, such as a USB flash disk, a mobile hard disk, a Read-Only Memory (ROM), a Random Access Memory (RAM), a magnetic disk, or an optical disk.

It should be noted that in this specification, the terms "comprise", "include", or any other variants are intended to encompass a non-exclusive inclusion, such that a process, method, article, or apparatus including a series of elements not only include those elements, but also other elements not explicitly listed, or elements inherent to such the process, method, article, or apparatus. Without any further limitation, an element defined by the phrase "includes one" does not exclude the existence of other same elements in the process, method, article, or apparatus that includes the elements. In addition, it should be pointed out that, the scope of the methods and apparatus in the embodiments of the present disclosure is not limited to perform functions in the order shown or discussed, and may also include performing the functions in a substantially simultaneous manner or in a reverse order according to the functions involved, for example, the described method may be performed in a different order than that described, and various steps may also be added, omitted, or combined. In addition, features described with reference to certain examples may be combined in other examples.

The foregoing describes embodiments of the present disclosure with reference to the accompanying drawings. However, the present disclosure is not limited to the foregoing specific implementations. The foregoing specific implementations are merely examples, but are not limitative. Inspired by this application, a person of ordinary skill in the art may further make many modifications without departing from the purposes of the present disclosure and the protection scope of the claims, and all the modifications shall fall within the protection scope of the present disclosure.

What is claimed is:

1. A voltage regulation circuit, comprising: a first N-Metal-Oxide-Semiconductor (NMOS) transistor, a second NMOS transistor, a third NMOS transistor, a control chip and an inductor, wherein a drain electrode of the first NMOS transistor is electrically connected to a drain electrode of the second NMOS transistor, a source electrode of the second NMOS transistor is electrically connected to a first terminal of the inductor, the first terminal of the inductor is further electrically connected to a drain electrode of the third NMOS transistor, and a source electrode of the third NMOS transistor is grounded; and an output terminal of the control chip is electrically connected to a gate electrode of the first NMOS transistor, a gate electrode of the second NMOS transistor, and a gate electrode of the third NMOS transistor, respectively;

wherein a source electrode of the first NMOS transistor is configured as a first port of the voltage regulation circuit, and a second terminal of the inductor is configured as a second port of the voltage regulation circuit, wherein, in operation, one of the first port and the second port serves as an input terminal of the voltage regulation circuit, while the other serves as an output terminal of the voltage regulation circuit, thereby enabling bidirectional power flow through the voltage regulation circuit;

wherein the voltage regulation circuit further comprises an enabling controller and a first driver, wherein the output terminal of the control chip is electrically connected to the gate electrode of the third NMOS transistor through the enabling controller and the first driver in sequence, and an enable terminal of the enabling controller is electrically connected to a first enable terminal of the control chip.

2. The voltage regulation circuit according to claim 1, further comprising a capacitor, wherein the second terminal of the inductor is grounded through the capacitor.

3. The voltage regulation circuit according to claim 1, further comprising an inverter having an enable terminal and a second driver, wherein the output terminal of the control chip is electrically connected to the gate electrodes of the first NMOS transistor and the second NMOS transistor through the inverter and the second driver in sequence, and the enable terminal of the inverter is electrically connected to a second enable terminal of the control chip.

4. A power supply module, comprising: a battery cell, a power line, and a bidirectional voltage converter, wherein the bidirectional voltage converter comprises the voltage regulation circuit according to claim 1; and a negative electrode of the battery cell is grounded, a positive electrode of the battery cell is electrically connected to a source electrode of the first NMOS transistor in the voltage regulation circuit, and a second terminal of the inductor in the voltage regulation circuit is electrically connected to the power line.

5. The power supply module according to claim 4, wherein the second terminal of the inductor is electrically connected to the power line through a first switch.

6. The power supply module according to claim 4, further comprising a housing, a heating element, a control circuit board, and a first temperature detection element;

wherein the battery cell, the heating element and the first temperature detection element are disposed in the housing, and the battery cell, the heating element and the first temperature detection element are electrically connected to the control circuit board, respectively; and the control circuit board controls the heating element to heat the battery cell when the first temperature detection element detects that a temperature of the battery cell is lower than a first threshold.

7. The power supply module according to claim 6, further comprising a thermally conductive plate, wherein the heating element is connected to the thermally conductive plate, and the thermally conductive plate covers a surface of the battery cell.

8. The power supply module according to claim 7, further comprising an adapter circuit board, wherein one terminal of the adapter circuit board is electrically connected to a tab of the battery cell, and the other terminal of the adapter circuit board is electrically connected to the control circuit board; and the adapter circuit board is located between the thermally conductive plate and the battery cell, and the first temperature detection element is disposed on the adapter circuit board.

9. The power supply module according to claim 6, wherein the housing comprises an inner housing and an outer housing, the inner housing is located inside the outer housing, an interlayer is formed between the inner housing and the outer housing, and an accommodating cavity is formed inside the inner housing; and the battery cell, the heating element and the first temperature detection element are located inside the accommodating cavity, respectively.

10. The power supply module according to claim 6, wherein a surface of the battery cell is covered with a thermal insulating layer.

11. The power supply module according to claim 6, wherein an input terminal of the heating element is electrically connected to the power line through a second switch, and an output terminal of the heating element is grounded through a third switch.

12. A vehicle, comprising a driving battery pack and the power supply module according to claim 4, wherein the driving battery pack is configured to drive the vehicle, and the driving battery pack is electrically connected to a control circuit board;

wherein the control circuit board controls a heating element to heat a battery cell based on the driving battery pack when a first temperature detection element detects that a temperature of the battery cell is lower than a first threshold.

13. A control method, applied in a control circuit board of the vehicle according to claim 12, comprising:

detecting a temperature of a battery cell based on a first temperature detection element, and receiving a first detecting result output by the first temperature detection element; and controlling the heating element to heat the battery cell based on a driving battery pack when the first detecting result indicates that the temperature of the battery cell is lower than a first threshold.

14. The control method according to claim 13, wherein after the controlling the heating element to heat the battery cell based on a driving battery pack, the method further comprises:

detecting the temperature of the battery cell based on the first temperature detection element, and receiving a second detecting result output by the first temperature detection element; and controlling the driving battery pack to stop supplying power to the heating element when the second detecting result indicates that the temperature of the battery cell is higher than a second threshold.

15. The control method according to claim 14, wherein the vehicle further comprises a second temperature detection element for detecting an external environment temperature of the vehicle, and before the controlling the driving battery pack to stop supplying power to the heating element, the method further comprises:

obtaining a detecting result of the second temperature detection element, and obtaining an average parking duration of each parking of the vehicle within a preset time period; and calculating the second threshold based on the detecting result of the second temperature detection element and the average parking duration.

16. The control method according to claim 13, wherein after receiving the first detecting result of detecting the temperature of the battery cell by the first temperature detection element, the method further comprises:

controlling the driving battery pack to charge the battery cell when the first detecting result indicates that the temperature of the battery cell is lower than the first threshold.

17. A non-transitory computer-readable storage medium, wherein the computer-readable storage medium stores a computer program, and the computer program is configured to implement the control method according to claim 13.

18. An electronic device, comprising:

a processor; and a memory, wherein the memory stores computer program instructions, and when the computer program instructions are run by the processor, the processor is configured to implement the control method according to claim 13.

* * * * *